Figure 5:
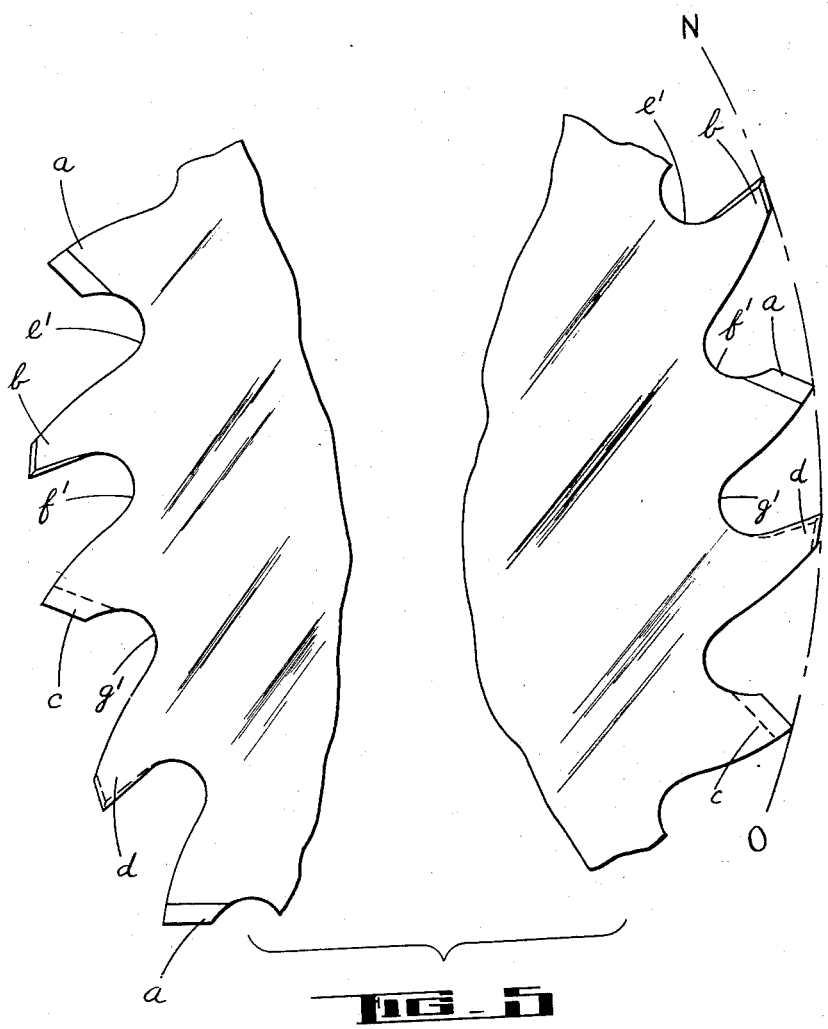

Sept. 18, 1956  A. G. TOMKIES  2,763,298
COMBINATION RIP AND CROSSCUT SAW
Filed May 15, 1953  2 Sheets-Sheet 1
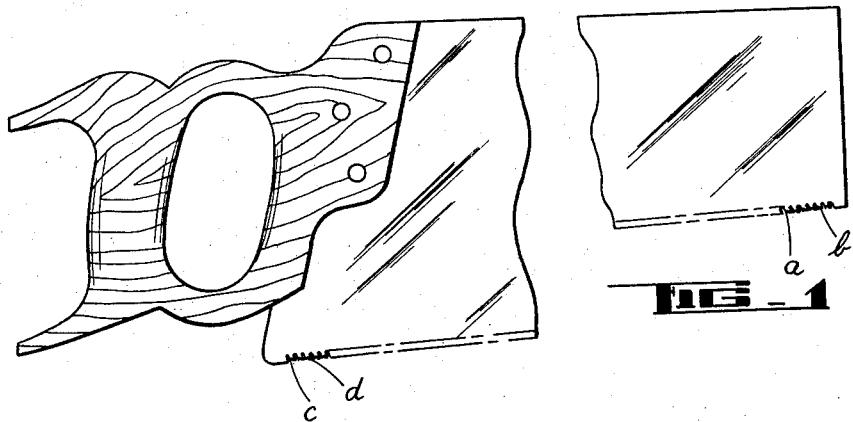
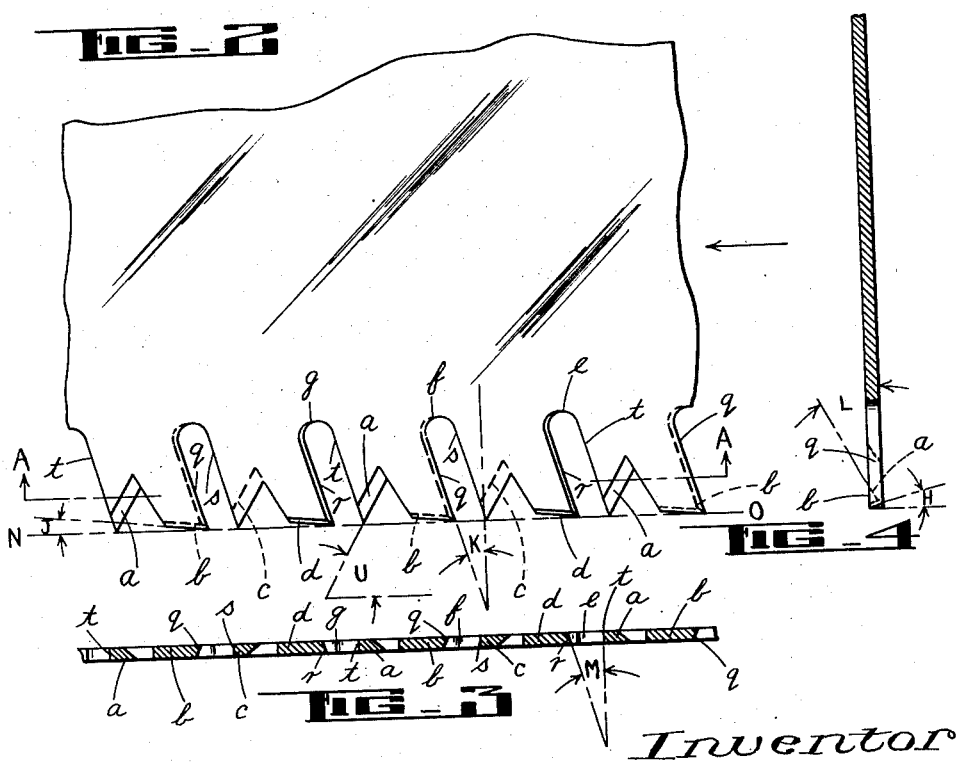
Inventor
A. G. Tomkies

United States Patent Office 2,763,298
Patented Sept. 18, 1956

2,763,298

COMBINATION RIP AND CROSSCUT SAW

Arthur Gretton Tomkies, Little Chaddock, Taupo, New Zealand

Application May 15, 1953, Serial No. 354,096

Claims priority, application New Zealand May 23, 1952

3 Claims. (Cl. 143—133)

This invention relates to a combination of saw teeth which applies to all wood cutting saws.

The object of the invention is to provide an improved and efficient wood cutting saw that is able to efficiently cut all woods, from the hardest to the softest and in every stage of seasoning to that of a perfectly green condition, and which is equally efficient in ripping and cross-cutting timber, either with straight grain, or with the most crooked grain and knots.

This improved combination of saw teeth results in a smooth cut surface, and also reduces the necessity for tooth set to a minimum, consequently effecting a saving in timber and power required for all wood sawing operations.

Thus the invention includes the provision of an improved combination of cutting teeth comprising side cutting teeth, sharpened from alternate sides and plough teeth also alternately sharpened. This combination of teeth may be arranged, either in pairs or the individual side cutting and plough teeth can be separated by a gullet particularly for a circular saw.

The invention will be described with reference to a straight edge handsaw but it is to be understood that the invention can be also applied to circular saws. Therefore, with reference to the accompanying drawing:

Figure 1 is a side elevation (broken) of a saw with the improved tooth arrangement.

Figure 2 is an enlarged side elevation of part of the tooth arrangement showing the teeth of he saw grouped in pairs, each pair comprising one side cutting tooth and one plough tooth; and showing the cutting edge of each side tooth of a pair following the cutting edge of its plough tooth, Figure 3 is an inverted plan view in section on line A—A of Figure 2, showing the angle of the faces of the plough teeth and showing the degree of cross taper in each gullet, Figure 4 is an end elevation of the teeth shown in Figure 2.

Figure 5 is an elevation (broken) of an alternative form of the invention as applied to a circular wood saw, in which the teeth are individually separated by gullets.

Referring to the drawings:

Figures 1 and 2 show side cutting teeth $a$ and $c$ grouped with plough or router teeth $b$ and $d$ respectively to form pairs, each pair comprising one side tooth and one plough tooth as they will hereinafter be termed with the cutting edge of each side tooth sharpened from the opposite side to the cutting edge of its plough tooth.

The side cutting teeth shown at $a$ and $c$ are alternately sharpened at a side rake angle of 30° with the vertical saw face, such angle being shown at L in Figure 4, and formed with a negative forward rake angle of 60° with the cutting line of the teeth, such angle of 60° being shown at U in Figure 2. The cutting line of the teeth is shown in Figure 2 marked N. O. Such cutting line becomes circular when this invention is applied to circular saws as is shown in Figure 5. The cutting edges of the plough teeth $b$ and $d$ are alternately sharpened at an angle of 15° to the horizontal, as illustrated by the angle marked H in Figure 4.

The angle of relief of the cutting edge of each plough tooth $b$ and $d$ is 5° as shown at J in Figure 2. This angle J may be varied to suit cutting conditions. The positive rake of the plough teeth $b$ and $d$ is 17° to the vertical of the saw edge as shown at K in Figure 2.

In the inverted plan view shown in Figure 3 the forward edges of the plough teeth $b$ and $d$ are bevelled to a side rake angle of 17° to a transverse line taken at right angles to the vertical face of the saw as shown at M. Figure 2 shows that the gullets $e$, $f$, $g$, which are formed by the front angled faces $q$ and $r$ of the plough teeth $b$ and $d$ and the square back faces $s$ and $t$ of the preceding side cutting teeth are tapered to facilitate the side ejection of the saw dust.

Figure 5 shows a modified form of the invention as applied to a circular saw, in which the side cutting teeth $a$ and $c$ and the plough teeth $b$ and $d$ are arranged alternately and in which each tooth is separated from each adjacent tooth by a gullet. Three of such gullets are identified by reference characters $e'$, $f'$, and $g'$, in Figure 5.

What I do claim and desire to obtain by Letters Patent of the United States of America is:

1. A wood saw in which the teeth are grouped in successive pairs, each pair being separated from adjacent pairs by a gullet of greater depth than the tooth length, the leading tooth of each pair being a plough tooth having a positive forward rake and a positive side rake, the following tooth of each pair being a side cutting tooth having a negative forward rake and a positive side rake to the side opposite the side rake of the plough tooth of the same pair.

2. A wood saw in which the teeth are grouped in successive pairs, each pair being separated from adjacent pairs by a gullet of greater depth than the tooth length, the leading tooth of each pair being a plough tooth having a positive forward rake of approximately 17° and a positive side rake of approximately 17°, the following tooth of each pair being a side cutting tooth having a negative forward rake of approximately 60° and a positive side rake of approximately 30°, said side rake of the teeth of each pair cutting on opposite sides of the kerf formed by the saw in use and the teeth of adjacent pairs having their side rakes disposed in the contrary sense.

3. The saw of claim 2 in which each plough tooth cuts the same side of the kerf as the side cutting tooth immediately preceding it, and each side cutting tooth cuts the opposite side of the kerf from the plough tooth immediately preceding it.

References Cited in the file of this patent

UNITED STATES PATENTS

| | | |
|---|---|---|
| 175,330 | Boynton | Mar. 28, 1876 |
| 211,346 | Robbins et al. | Jan. 14, 1879 |
| 279,975 | Neidig | June 26, 1883 |
| 452,391 | Rothgery | May 19, 1891 |
| 493,934 | Lyppe | Mar. 21, 1893 |
| 790,072 | McLean | May 16, 1905 |